US008146380B1

(12) United States Patent
Wright et al.

(10) Patent No.: US 8,146,380 B1
(45) Date of Patent: Apr. 3, 2012

(54) ROCKER CHILLER WITH IMPROVED PRODUCT MOISTURE RETENTION

(76) Inventors: Terry A. Wright, Cary, NC (US); John P. Shell, Raleigh, NC (US)

( * ) Notice: Subject to any disclaimer, the term of this patent is extended or adjusted under 35 U.S.C. 154(b) by 0 days.

(21) Appl. No.: 13/158,661

(22) Filed: Jun. 13, 2011

Related U.S. Application Data

(63) Continuation-in-part of application No. 13/070,521, filed on Mar. 24, 2011.

(60) Provisional application No. 61/424,363, filed on Dec. 17, 2010.

(51) Int. Cl.
| | |
|---|---|
| F25D 17/02 | (2006.01) |
| F25D 25/02 | (2006.01) |
| F28D 11/08 | (2006.01) |
| F28F 17/00 | (2006.01) |
| F28F 13/12 | (2006.01) |
| B01F 11/00 | (2006.01) |
| B01F 7/00 | (2006.01) |
| A21D 4/00 | (2006.01) |
| A23C 3/00 | (2006.01) |

(52) U.S. Cl. .............. 62/375; 62/64; 62/381; 165/88; 165/94; 165/109.1; 366/276; 366/278; 366/309; 366/325.2; 366/325.4; 426/332; 426/335; 426/524

(58) Field of Classification Search ............... 165/109.1, 165/86–94, 104.31, 120, 134; 62/62, 63, 62/64, 336, 337, 374–382; 366/276, 277, 366/309, 325.1–325.93; 426/332, 327, 335, 426/524, 644

See application file for complete search history.

(56) References Cited

U.S. PATENT DOCUMENTS

| | | | |
|---|---|---|---|
| 1,942,307 A | 1/1934 | Reeh | |
| 2,164,277 A * | 6/1939 | James | 68/131 |
| 3,004,407 A | 10/1961 | Morris, Jr. | |
| 3,022,646 A * | 2/1962 | Zebarth | 62/381 |
| 3,097,501 A | 7/1963 | Pappas | |
| 3,250,086 A | 5/1966 | Morris, Jr. | |
| 3,340,696 A * | 9/1967 | Zebarth et al. | 62/63 |
| 3,407,872 A | 10/1968 | Crane | |
| 3,410,101 A | 11/1968 | Morris, Jr. | |
| 3,426,546 A * | 2/1969 | Crane | 62/63 |
| 4,860,554 A * | 8/1989 | Innes et al. | 62/374 |
| 4,875,344 A | 10/1989 | Zittel | |
| 5,327,817 A * | 7/1994 | Zittel | 99/348 |
| 5,456,091 A | 10/1995 | Zittel | |
| 5,484,615 A | 1/1996 | Kounev | |

(Continued)

OTHER PUBLICATIONS

Shell Exhibit 1: Website: Morris-Associates.com/page/drag_chiller, 4 pages.

(Continued)

*Primary Examiner* — Frantz Jules
*Assistant Examiner* — Henry Crenshaw
(74) *Attorney, Agent, or Firm* — Thomas, Kayden, Horstemeyer & Risley, LLP

(57) ABSTRACT

The rocker chiller 10 includes a semi-cylindrical tank 12 filled with heat exchanging liquid and a baffle assembly 18 that rocks back and forth across the bottom wall of the tank. The baffle 26 of the baffle assembly 18 defines baffle openings 29 that are sized and shaped to pass the heat exchanging liquid through the openings in response to the rocking of the baffle, but small enough so that the baffle engages and retards the movement of at least some of the carcasses from moving through the baffle, thereby massaging the carcasses and increasing the moisture retained in the carcasses.

10 Claims, 12 Drawing Sheets

U.S. PATENT DOCUMENTS

| | | |
|---|---|---|
| 5,868,000 A | 2/1999 | Morris, Jr. et al. |
| 6,214,400 B1 | 4/2001 | Zittel et al. |
| 6,279,328 B1 | 8/2001 | Leeds |
| 6,301,905 B1 | 10/2001 | Gallus |
| 6,308,529 B1 | 10/2001 | Bass |
| 6,397,622 B1 | 6/2002 | Miller et al. |
| 6,658,886 B1 | 12/2003 | Bass |
| 7,174,724 B2 * | 2/2007 | Morris et al. ............ 62/64 |
| 7,470,173 B2 | 12/2008 | Morris, III et al. |
| 7,588,489 B2 | 9/2009 | Morris |
| 2005/0279107 A1 * | 12/2005 | Vinberg ............ 62/64 |
| 2007/0169502 A1 * | 7/2007 | Morris et al. ............ 62/374 |

OTHER PUBLICATIONS

Shell Exhibit 2: Morris & Associates Heavy Duty Rocker Chiller, 2 pages.

Shell Exhibit 3: Simon-Johnson Positive Control Chiller, printed advertisement, 4 pages.

Shell Exhibit 4: Cantrell Giblet Chiller, 4 pages.

Shell Exhibit 5: Photograph of a dasher assembly for a baker spin chiller.

Proline Grader by Marel, © 1999-2011.

* cited by examiner

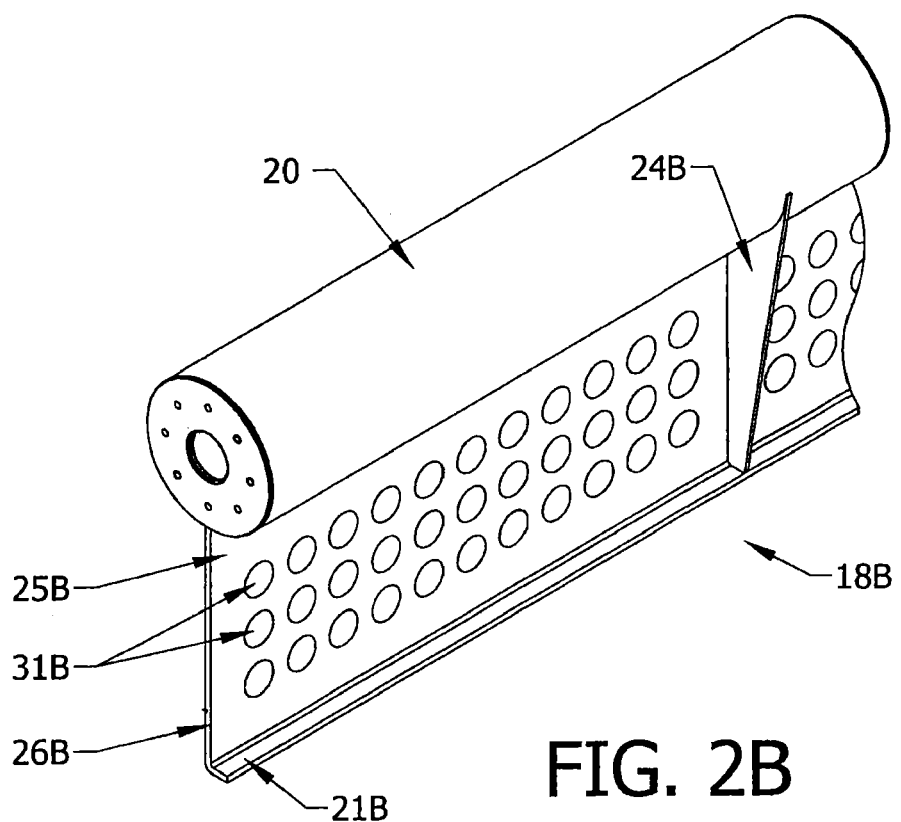

ROCKER CHILLER WITH IMPROVED PRODUCT MOISTURE RETENTION

CROSS-REFERENCE TO RELATED APPLICATIONS

This application is a continuation-in-part of non-provisional patent application U.S. Ser. No. 13/070,521 filed in the U.S. Patent & Trademark Office on Mar. 24, 2011, and this application also claims priority to and the benefit of U.S. provisional patent application U.S. Ser. No. 61/424,363 filed Dec. 17, 2010 in the U.S. Patent & Trademark Office, both of which are incorporated herein by reference in their entireties.

TECHNICAL FIELD

The present disclosure generally relates to rocker chillers for carcasses such as poultry carcasses, that reduces the temperature and increases the moisture retention of the carcasses and that enhances the ability of the carcasses to more effectively respond to disinfectant.

BACKGROUND

Paddle type chillers, also known as "rocker chillers," have a history of use in the poultry processing industry and in other food processing industries. The basic principle of operation is that a paddle or long blade is used to agitate poultry carcasses in a tank of cold heat exchanging liquid to chill the carcasses as the carcasses are advanced by movement of the liquid through the tank.

Continuous introduction of cold water in one end of the tank and removal of warmer water at the other end of the tank provides the mechanism for removing heat from the carcasses and for moving the carcasses along the length of the tank. The side to side rocking motion of a paddle adjacent the semi-cylindrical bottom wall of the tank tends of distribute the carcasses throughout the volume of heat exchanging liquid, thus assuring more thorough contact between the water and the product and more rapid chilling.

An unexpected consequence of paddle type chiller operation has been that carcasses processed in some such chillers retain more moisture than those processed in other types of chillers. Until now, it appears that this moisture retention phenomenon has not been understood or fully exploited. The current invention addresses optimization of moisture retention as well as improving certain operational problems of paddle type chillers.

Moisture retention in the poultry carcasses has significant financial implications for the poultry processing industry. The industry typically measures "yield" of the carcasses as the weight of processed carcasses divided by the live weight of birds delivered to the plant expressed as a percentage. Typical yield for whole carcasses can be around 74%. Processing steps that remove moisture from the meat will reduce yield since the weight of moisture removed is not included in the final product. Use of prior art rocker chillers has been shown to increase yield by about 1%. Use of chillers designed according to the current invention has increased yield by an additional 1% or more. To put this in perspective, a 1% increase in yield at a modest size plant processing 400,000 pounds of poultry per day would generate an additional 5400 pounds of salable product with an additional wholesale value of about $840,000 per year at current prices.

SUMMARY OF THE DISCLOSURE

Briefly described this disclosure concerns a rocker chiller for reducing the temperature of carcasses, such as poultry carcasses received from a processing line that still may be near their normal live temperature of about 104° F. The chiller, which may be a pre-chiller or a final chiller, or the only chiller in the poultry processing line, may include an elongated tank with a semi-cylindrical bottom surface for containing a cold heat exchanging liquid at a liquid level in the tank. An elongated baffle assembly is positioned in the tank and extends along the length of the tank and means, such as a motor, are provided for oscillating the baffle assembly across the curved bottom of the tank for moving the carcasses laterally in the tank through the body of heat-exchanging liquid.

The baffle assembly may include a baffle that includes a lower edge adjacent the semi-cylindrical bottom surface of the tank and a body portion that extends upwardly from the lower edge toward the surface of the liquid in the tank. The baffle may include baffle openings sized and shaped to allow the heat-exchanging liquid to pass through the baffle in response to the oscillation of the baffle and to retard the movement of carcasses through the baffle as the heat exchanging liquid rushes about the carcasses. The baffle assembly may include a baffle blade that extends along the lower edge of the baffle and is positioned adjacent the facing curved surface of the tank and provides structural support for the baffle. The baffle defines baffle openings therethrough that are selected from shapes including, for example: circular, non-circular, elongated and polygonal. Other shapes may be used. The baffle openings allow the chilling liquid to rush through the baffle and about the poultry carcasses moving with the baffle. The poultry carcasses tend to become more densely gathered in the heat exchanging liquid when the baffle sweeps in that direction and less densely gathered on the trailing side of the baffle, contributing to a massaging action on the carcass.

The rocker chiller disclosed herein may further include a carcass guide shaped for directing the carcasses moving into the tank to alternate sides of the tank, for example, to the side of the tank in which the baffle is positioned. The carcass guide may move in unison with the baffle assembly.

BRIEF DESCRIPTION OF THE FIGURES

The present disclosure will be better understood with reference to the following drawing figures. Similar reference numerals designate corresponding parts throughout the figures, and components in the figures are not necessarily to scale.

FIGS. 2A, 2B, 2C, 2D, 2E, and 2F are perspective sections of portions of baffle assemblies that include baffles of different configurations that extend from the semi-cylindrical bottom wall upwardly toward the surface of the heat exchanging liquid.

DETAILED DESCRIPTION

Figure 1A:
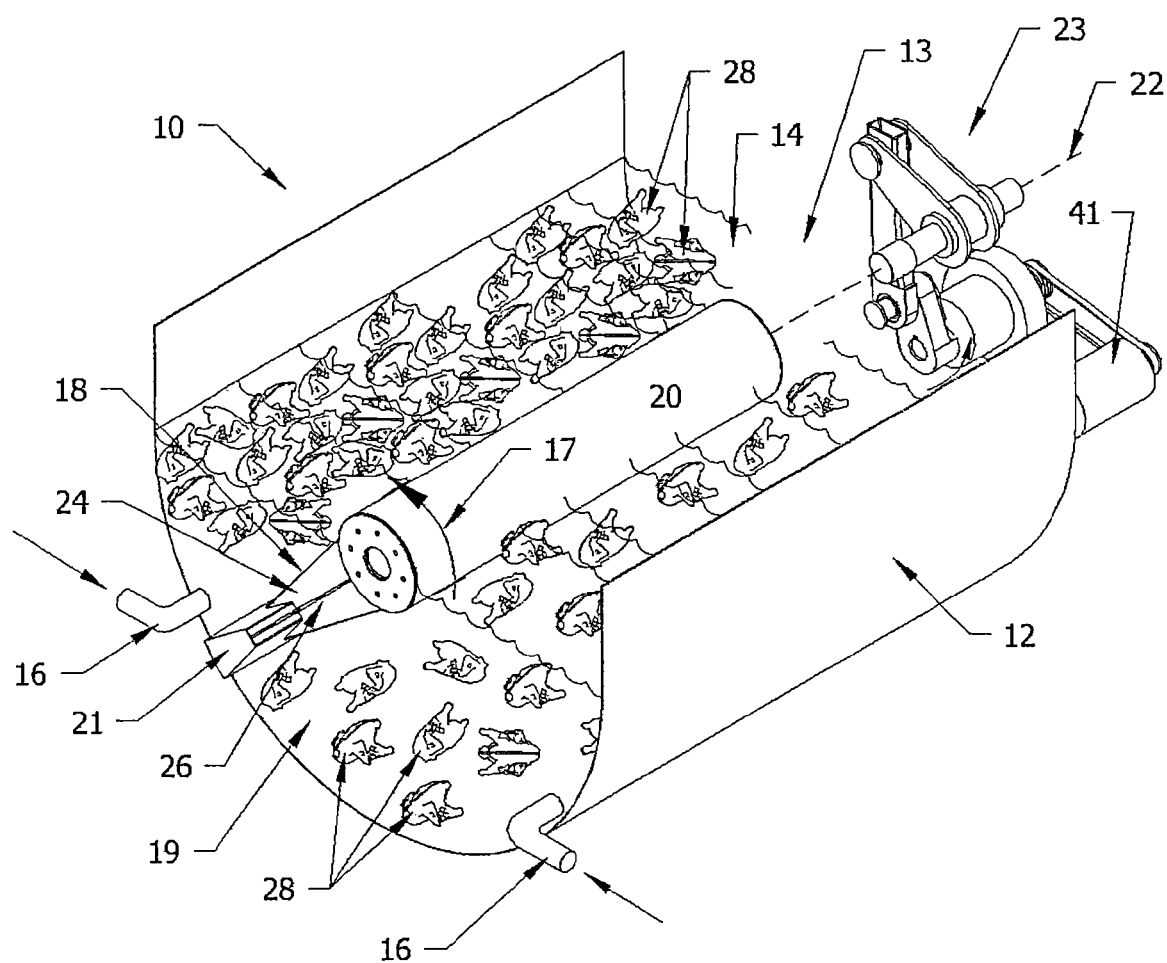
FIGS. 1A, 1B and 1C are perspective sections of a rocker chiller, showing the elongate baffle assembly in its left, centered and right positions, respectively.
Figure 1B:
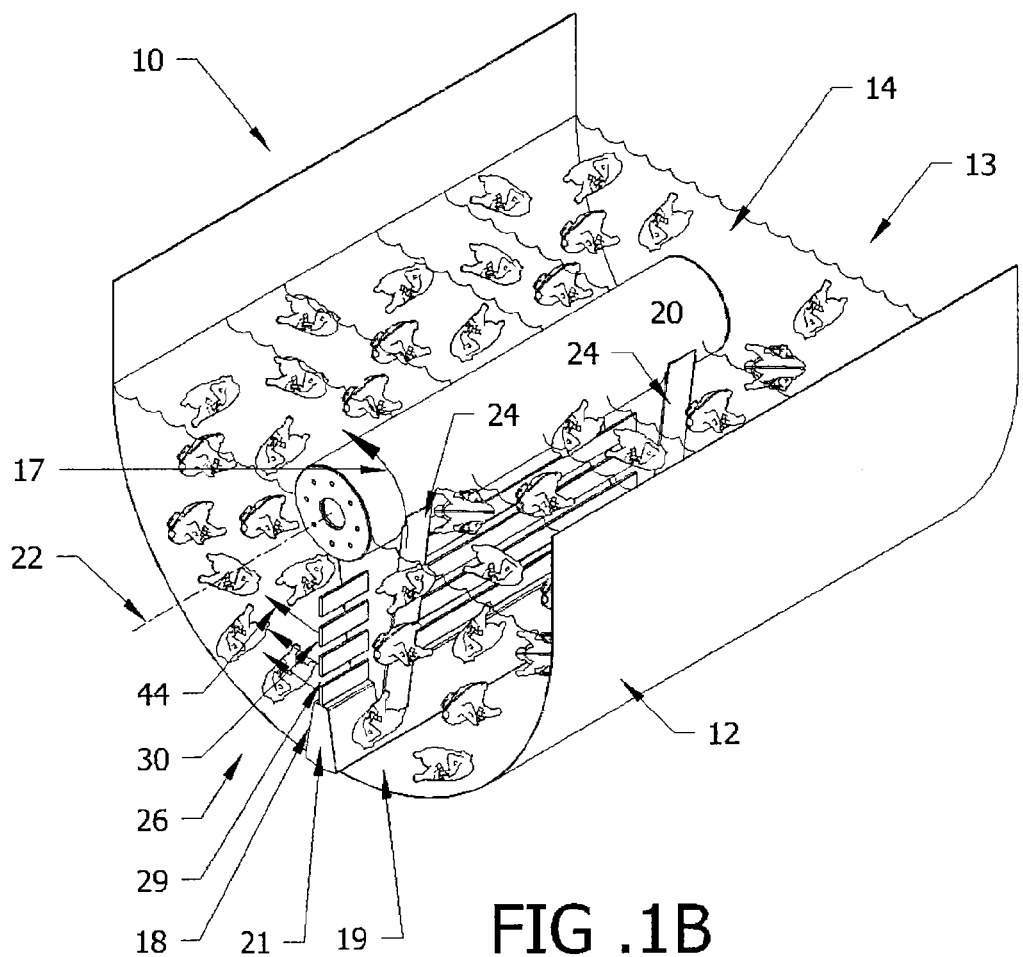
Figure 1C:
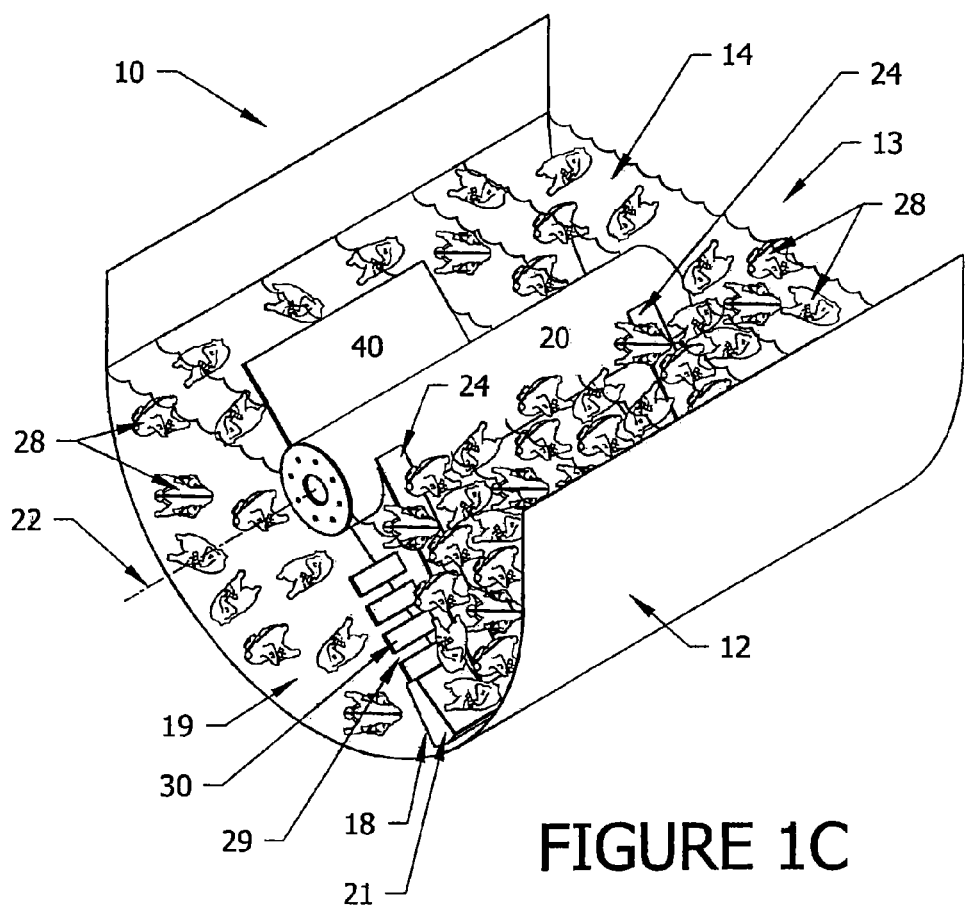

Referring now in more detail to the drawings in which like numerals indicate like parts throughout the several views, FIGS. 1A-1C show a rocker chiller 10 that includes a semi-cylindrical tank 12 that is substantially filled with a body of heat exchanging liquid 14. The temperature of the heat exchanging liquid may vary in accordance with the carcasses being treated and the manner of treatment of the carcasses. For example, the heat exchanging liquid may be water with antimicrobial and other desirable additives. If the rocker chiller is to be used as a pre-chiller, in which the carcasses of chickens at 104° F. are going to be treated, the temperature of the heat exchanging liquid in the tank may be at about 60° F., a difference of about 44° F. If, however, the principles of the rocker chiller are used in a final chiller tank, the temperature of the heat exchanging liquid might be just above 32° F.

In addition to the heat exchanging liquid 14 that substantially fills the tank 12, FIG. 1A shows that additional heat exchanging liquid may enter the tank by recirculation conduits 16 that direct a cold stream of makeup heat exchanging liquid along the length of the semi-cylindrical bottom wall 19 of the tank, preferably at the predetermined positions above the sweep of the baffle assembly 18, to be described hereinafter. The makeup liquid entering through the recirculation conduits will be at the desired temperature for the purpose of chilling the carcasses, and tends to urge the carcasses gathered at the upper facing surface of the baffle assembly along the length of the semi-cylindrical tank 12 toward the exit end 13 of the tank. This is disclosed in more detail in U.S. Patent Application Publication 2007/0169502 A1, dated Jul. 26, 2007, the disclosure of which is incorporated herein by reference.

FIGS. 1A, 1B and 1C show the rocker chiller 10 with its baffle assembly 18 in different positions, with the lower edge portion of the baffle assembly to the left, centered and to the right, respectively. It will be appreciated that the baffle assembly 18 substantially divides the heat exchanging liquid 14 into two regions of variable volume depending on the position of the baffle assembly within its range of motion. Due to the design of the baffle, the heat exchanging liquid 14 may freely communicate between the two regions, but the carcasses 28 are at least partially confined to the region in which each was originally introduced. Carcasses in each region will be more or less densely gathered in the heat exchanging liquid as the volume of the region changes due to the motion of the baffle assembly 18. Alternate cycles of compression and expansion have beneficial effect on the carcasses as will be described more fully in this description.

Baffle assembly 18 includes a drive shaft 20 that may extend at the liquid level along the length of the semi-cylindrical tank 12. Drive shaft 20 oscillates about the longitudinal axis 22, which may be the longitudinal axis for both the drive shaft 20 and the semi-cylindrical tank 12. A power means 23 is used to oscillate the drive shaft. An electric motor 41 and gear box may function as the power means. In the embodiment illustrated in FIGS. 1A-1C, the baffle assembly 18 includes support arms 24 that are mounted at their upper ends to and extend radially downwardly from the drive shaft 20, with the support arms spaced along the drive shaft. Baffle 26 is formed of parallel spaced apart horizontal slats 30 that are supported at their ends by the radially extending support arms 24. The chilling liquid in the tank moves through the spaces 29 between the baffle slats 30 in response to the movement of the baffle 26. The spaces 29 between the baffle slats 30 are too small for most of the poultry carcasses to quickly and easily pass between the baffle slats. The lower edge portion of baffle assembly 18 may include one or more elongated baffle blades 21 that are supported by the radially extending support arms 24 and extend parallel to the drive shaft 20. The baffle blade 21 of FIGS. 1A-1C is sized, shaped and positioned by the support arms 24 so as to sweep closely adjacent the facing semi-cylindrical bottom wall 19 of tank 12.

A conventional drive motor 41 and transmission 23 are connected to the drive shaft 20 of the rocker chiller and function as means for oscillating the baffle assembly 18 in an arc from side to side in the heat exchanging liquid 14 across the interior facing surface of the tank 12, as shown by arrow 17. When the baffle assembly oscillates, it sweeps from side to side and tends to engage and move the poultry carcasses 28 adjacent the side wall of the tank toward alignment with recirculation conduits 16 as indicated in FIGS. 1A and 1C.

Poultry carcasses 28 are placed in the tank 12 with the carcasses being generally submerged in the heat exchanging liquid 14. Most of the carcasses tend to slowly sink toward the bottom of the heat exchanging liquid 14, adjacent the interior surface 18 of the semi-cylindrical bottom wall of tank 12.

With this arrangement, some of the carcasses 28 are engaged by the baffle assembly 19 and move up with the movement of the baffle and become aligned with the streams of liquid emitted from the recirculation conduits 16 so that the recirculated heat exchanging liquid that may bear an antimicrobial is directed against the carcasses. The drive motor may operate to intermittently pause the baffle assembly 18 at its up positions at the sides of the tank when the baffle assembly is aligned with a recirculation conduit 16. The oncoming streams of heat exchanging liquid tend to urge the carcasses 28 along the length of the tank 12 toward the discharge end of the tank and to wash the carcasses with the heat exchanging liquid.

As shown in FIG. 1B, the baffle 26 extends from the baffle blade 21 at the lower edge of the baffle 26 upwardly toward the drive shaft 20 and toward the surface of the heat exchanging liquid 14. The parallel slats 30 of baffle 26 have openings 29 extending between them for the passage of the heat exchanging liquid 14 through the baffle as the baffle moves from side to side.

The baffle 26 includes openings extending therethrough that may be of various shapes, such as circular, non-circular, elongated, and polygonal. Other shapes of baffle openings may be suitable, as generally shown in FIGS. 2A-2F. The openings in the baffle 26 are sized and shaped for reducing the likelihood of the carcasses becoming caught in the openings of the baffle but permitting the heat exchanging liquid 14 in the tank 12 to move through the baffle. The baffle may be formed of sheet metal, expanded metal, woven wire, perforated sheet material, one or more slats or a plurality of parallel rods supported by adjacent ones of the support arms 24 or by a plurality of parallel rods extending radially out from the drive shaft 20 and joined or not at the distal ends by a baffle blade 21. The baffle may be made of materials that are stable and strong in the heat exchanging liquid. Further, the openings in the baffle may be larger than described above, with the spaces allowing movement of some carcasses through the baffle. Preferably the openings in the baffle are of a size and shape so that the carcasses do not become caught in the baffle.

Figure 2A:
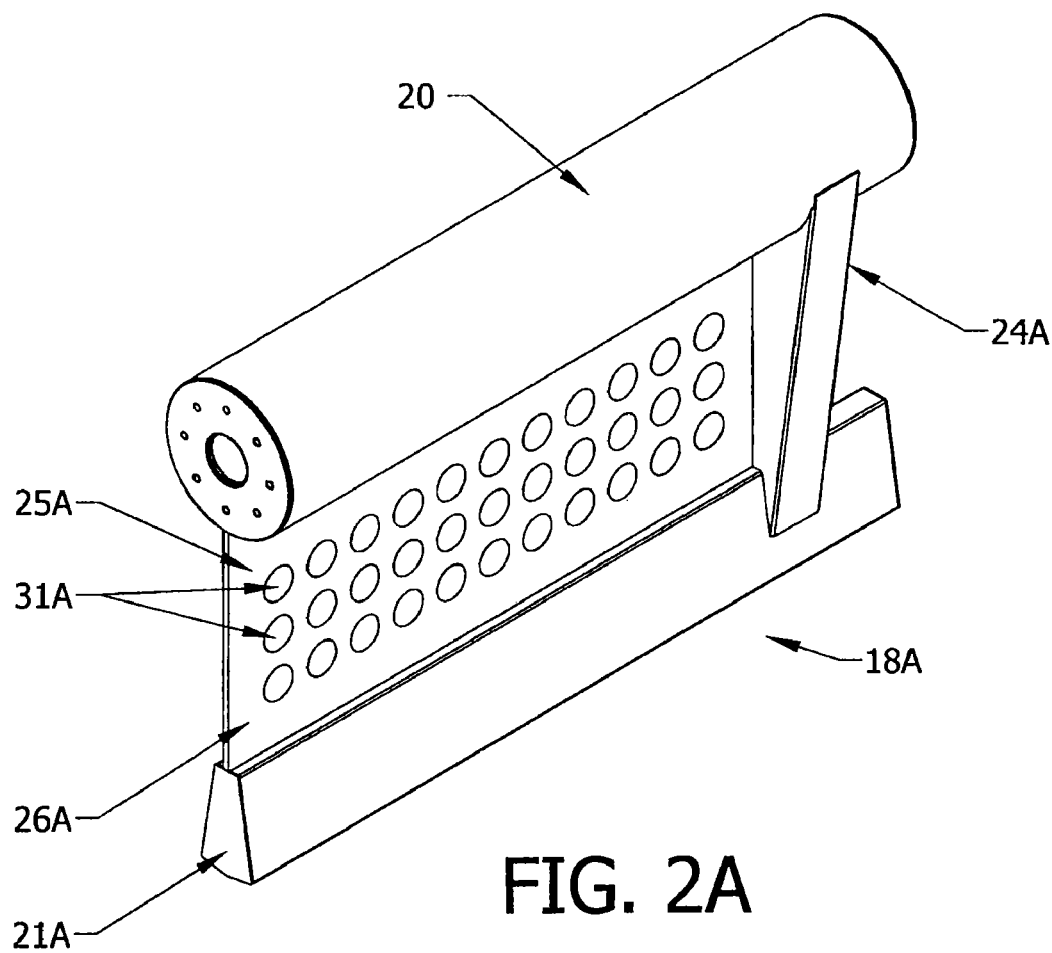

As shown in FIG. 2A, the baffle 26A of baffle assembly 18A includes a perforated sheet 25A extending radially downwardly from drive shaft 20 that defines an array of openings 31A, with the baffle 26A forming an upward extension of baffle blade 21A. The perforated sheet may extend from the baffle blade 21A upwardly to the drive shaft 20. The radially extending support arms 24A support the baffle assembly from the drive shaft 20.

As shown in FIG. 2B, the baffle 26B of baffle assembly 18B may be a perforated sheet 25B that extends radially from drive shaft 20 to baffle blade 21B. The perforated sheet 25B also defines an array of openings 31B, and the baffle 26B forms an upward extension of baffle blade 21B. The radially extending support arms 24B support the baffle assembly from the drive shaft 20.

Figure 2C:
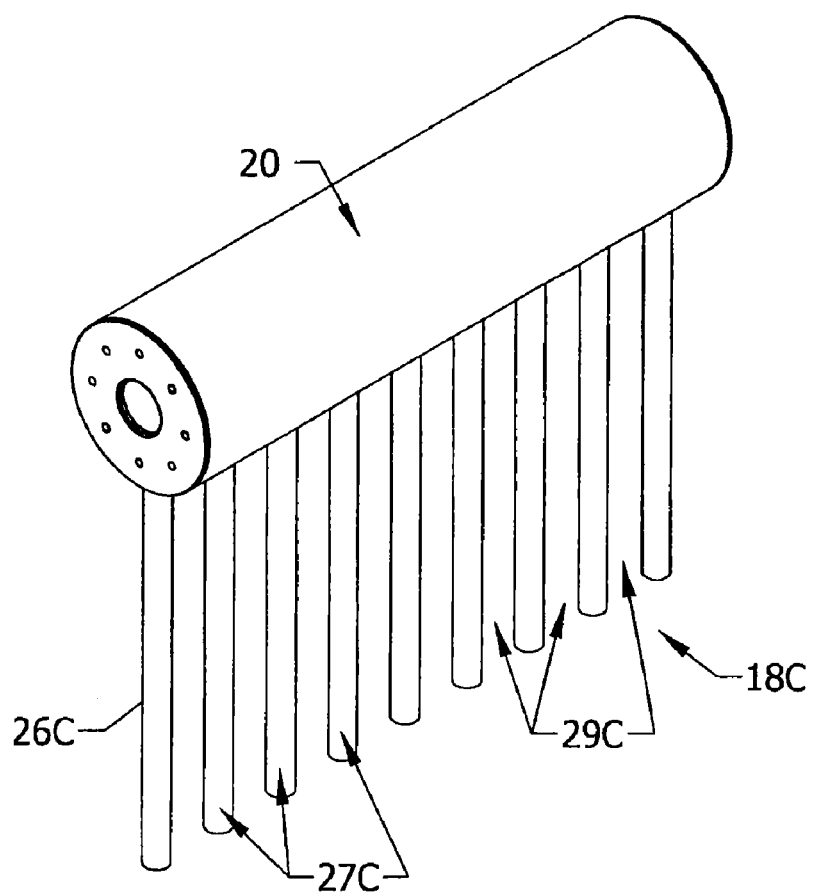

As shown in FIG. 2C, the baffle 26C of baffle assembly 18C includes a plurality of parallel spaced bars 27C mounted to and extending downwardly from the drive shaft 20. Spaces 29C are formed between the bars 27C and are sized as previously described, to retard the movement of the poultry carcasses from one side to the other side of the baffle as the baffle oscillates from side-to-side. The bars 27C are of a length so that the lower ends of the bars move closely adjacent the facing cylindrical surface of the tank so the carcasses are not likely to pass about the end of a bar.

Figure 2D:
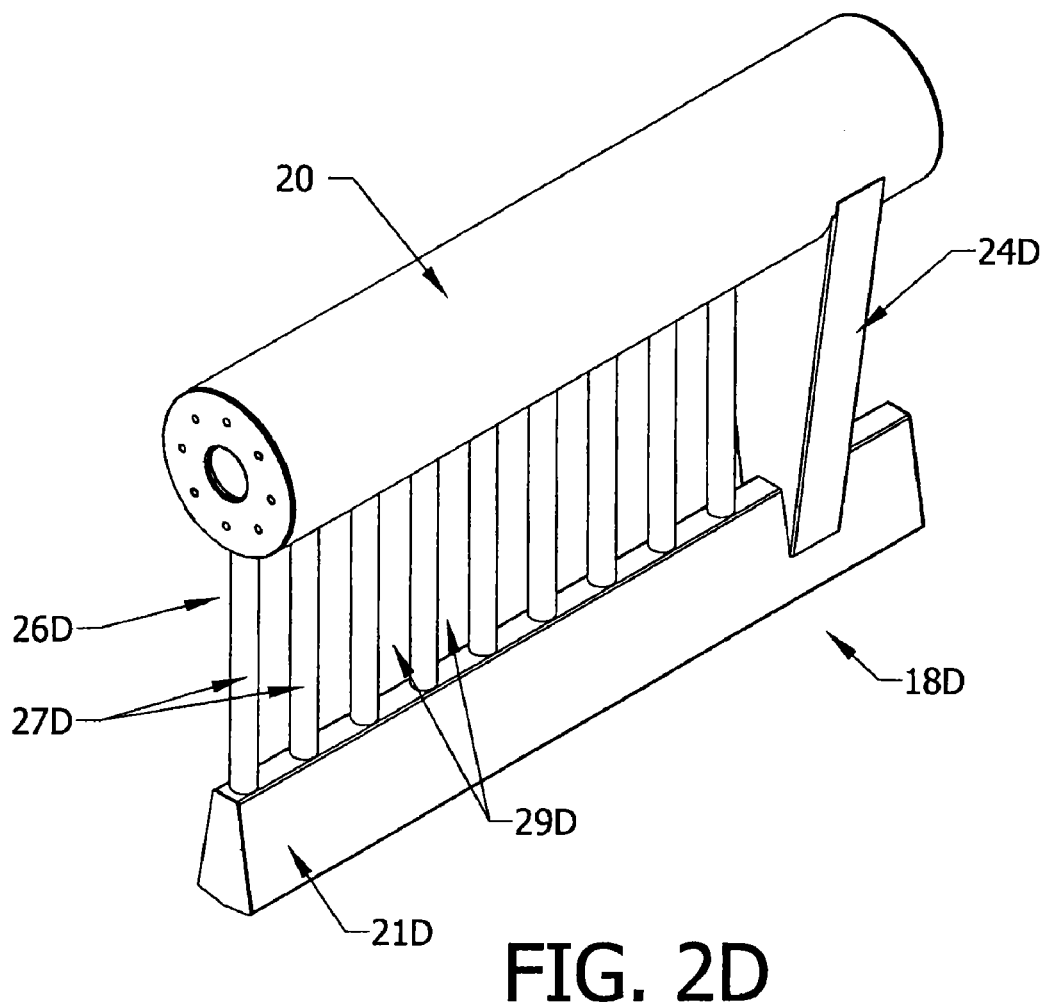

As shown in FIG. 2D, the baffle 26D of baffle assembly 18D includes a plurality of parallel spaced bars 27D mounted to and extending downwardly from the drive shaft 20 and joined at their lower ends to longitudinally extending baffle blade 21D. Spaces 29D are formed between the bars 27D and are sized as previously described, to retard the movement of the poultry carcasses from one side to the other side of the baffle as the baffle oscillates from side-to-side.

Figure 2E:
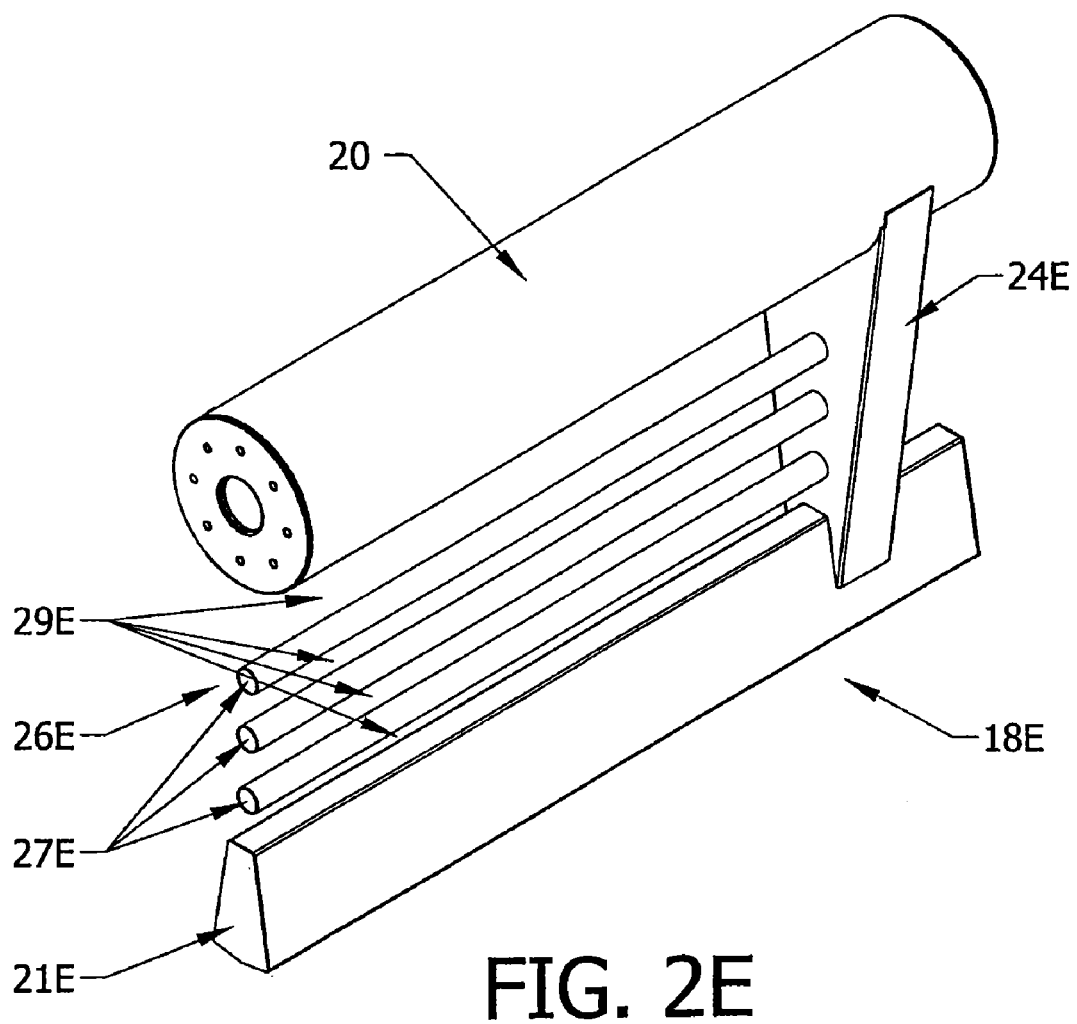

As shown in FIG. 2E, the baffle 26E of baffle assembly 18E includes a plurality of horizontally extending parallel spaced bars 27E positioned between and parallel to the drive shaft 20 and baffle blade 21E. Spaces 29E are formed between the bars 27E and are sized as previously described, to retard the movement of the poultry carcasses from one side to the other side of the baffle 26E as the baffle oscillates from side-to-side. Radially extending support arms 24E support the baffle 26E and baffle blade 21E from the drive shaft 20.

Figure 2F:
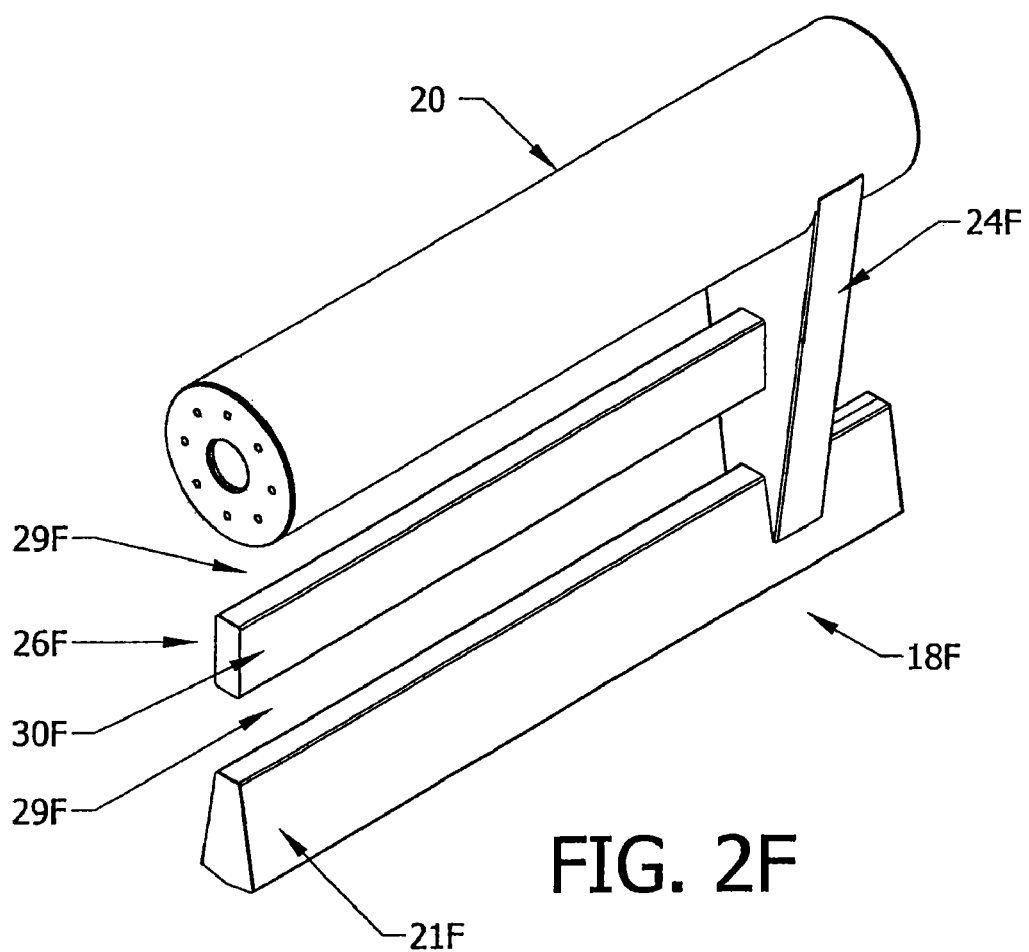

As shown in FIG. 2F, the baffle 26F of baffle assembly 18F includes at least one wide slat 30F positioned between the drive shaft 20 and the baffle blade 21F. Spaces 29F are formed on opposite sides of baffle slat 30F and are sized as previously described, to retard the movement of the poultry carcasses from one side to the other side of the baffle as the baffle oscillates from side-to-side. Radially extending support arms 24F support the baffle 26F and baffle blade 21F from the drive shaft 20.

While the baffle blades 21A, 21B, 21D, 21E and 21F may provide structural and operational advantages in specific cases, it is not necessary to the general function of the baffle which is to allow heat exchanging to pass through while retarding the passage of carcasses. For example, the baffle blade 21E could be replaced by additional parallel rods 27E of FIG. 2E while retaining adequate structural integrity and the baffle would function as intended.

In some cases, the baffle may be designed with sufficient structural integrity to eliminate the need for the baffle blade and even the support arms. FIG. 2B shows a perforated baffle 26B with a lip 21B at the lower edge. The lip provides sufficient rigidity to avoid excessive flexure under the loads imposed on the baffle by the oscillating motion. The support arms 24B of FIG. 2B have been reduced to flat ribs which carry the bending load where the baffle attaches to the central drive shaft 20.

FIG. 2C shows an embodiment in which the baffle includes a series of radially extending parallel rods 27C that span from the drive shaft 20 to a length that places the ends of the rods adjacent the inner surface of the tank 12. The spaces between the ends of the rods 27C and the tank 12 are small enough that carcasses cannot become wedged between rod and tank, but large enough that the rods do not touch the tank at any point in their range of motion. The rods are designed of such size and strength that each rod can bear the bending load imposed by the local resistance to the oscillatory motion of the baffle assembly. Neither baffle blade nor support arms may be required in this embodiment. Note also that the lower edge of this baffle is not a continuous physical edge but rather an imaginary edge interpolated between the distal ends of rods.

Figure 3A:
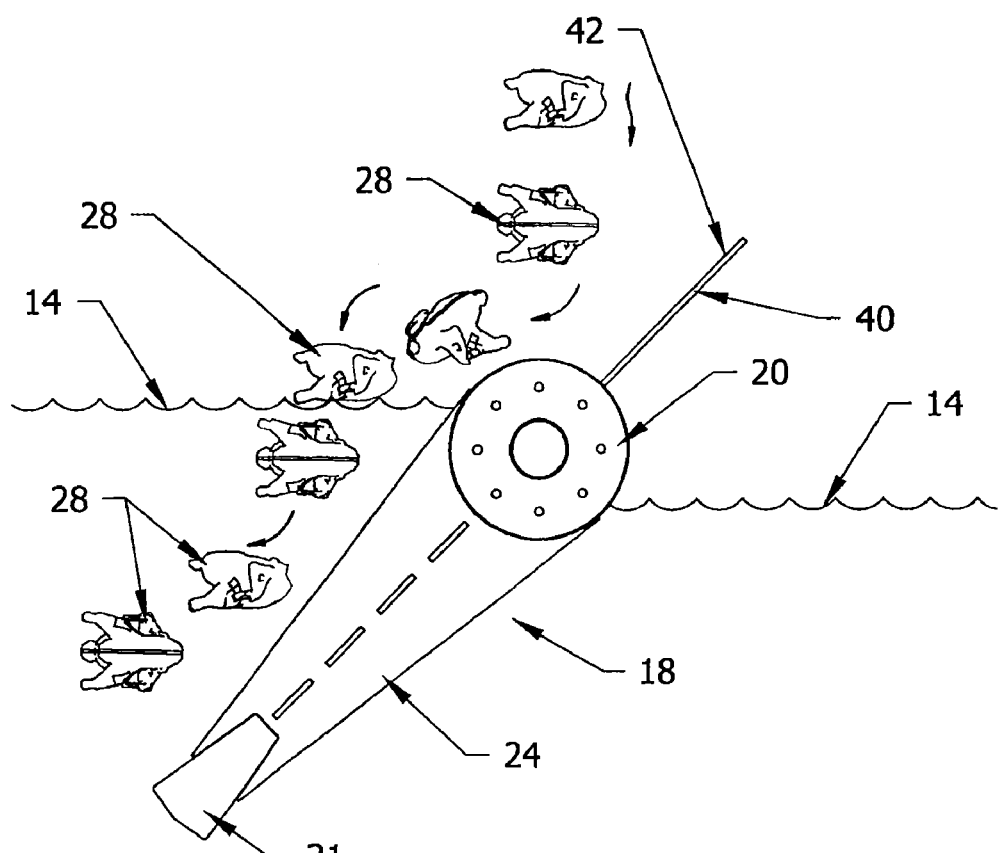
FIGS. 3A and 3B are end views of a baffle assembly with a carcass guide that directs the oncoming carcasses into the chilling heat exchanging liquid.
Figure 3B:
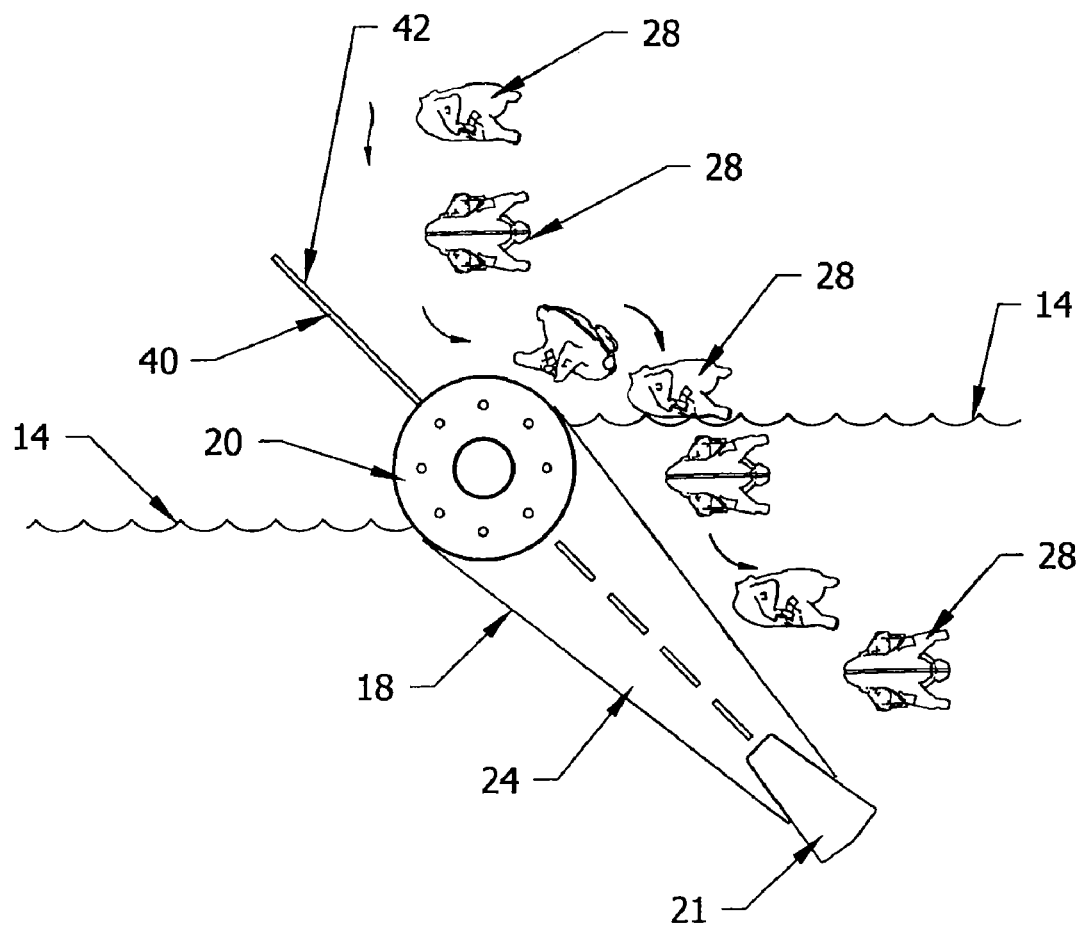

FIGS. 3A and 3B illustrate the positions of a baffle assembly 18 when the baffle assembly has moved from one side over to the other side of the semi-cylindrical tank. A carcass guide 40 extends upwardly from drive shaft 20. The carcass guide 40 may be a plate or other surface that extends from the drive shaft 20 in the opposite direction when compared to the radially extending support arms 24.

The carcass guide may comprise a deflector plate 42 or other guide surface that functions to direct the oncoming carcasses 28 downwardly at a sloped angle into the heat exchanging liquid 14. As shown in FIG. 3A, the carcass guide 40 is positioned on the opposite side of the drive shaft 20 from the baffle assembly and the carcass guide moves to the opposite side of the drive shaft 20 in comparison to the movement of the baffle assembly. This causes the carcass guide 40 to deliver the carcasses to the heat exchanging liquid 14 on the side where the baffle assembly 18 is raised in the liquid 14. When the baffle assembly sweeps to the other side of the tank, as shown in FIG. 3B, the carcass guide will be extended upwardly to the opposite side in comparison with FIG. 3A, so as to direct the oncoming poultry carcasses 28 to where the baffle assembly has been raised. This tends to equally divide the oncoming carcasses on opposite sides of the baffle assembly over time.

In the current invention, the baffle restricts carcasses from moving through the baffle assembly, and the poultry carcasses 28 tend to become more densely gathered in the turbulent heat exchanging liquid 14 when the baffle assembly 18 sweeps in that direction and less densely gathered on the trailing side of the baffle assembly as shown in FIGS. 1A, 1B and 1C.

The contact of the carcasses with the surfaces of the tank 12, with the baffle assembly 18 and with one another creates a mild compression of each carcass, providing the benefit of massaging the meat of the carcasses. Repeated cycles of compression and relaxation cumulatively tend to help break down some of the cell structure of the carcasses, thereby tenderizing the meat and creating microscopic voids where moisture can be retained within the product.

It is desirable to not only chill the carcasses but to massage the carcasses so that moisture will be retained in the product through the production process. The additional surface area of the baffle provides more contact with the carcasses thus promoting the massaging action.

As the poultry carcasses gather more densely on the leading side of the baffle assembly, the heat exchanging liquid rushes through the baffle toward the opposite side of the tank. This is illustrated by the horizontal arrows 44 in FIG. 1B, showing how the water rushes from the right side, through the baffle of the blade assembly, and then into the left portion of the tank. The rush of heat exchanging liquid tends to push the carcasses against the baffle, further enhancing the massaging effect on the meat. In addition, heat exchanging liquid rushing past the carcasses as they accumulate adjacent the baffle enhances the heat exchange efficiency. This enhanced efficiency assures that the chilling function does not suffer significantly as a result of the asymmetrical distribution of carcasses within the heat exchanging liquid.

A result of the new rocker chiller herein disclosed is the washing action of the more vigorous movement and more positively churning of the birds about in the heat exchanging liquid 14. This vigorous washing function of the carcasses tends to remove bits of organic matter that are usually carried by the carcasses into the heat exchanging liquid. This vigorous churning tends to get more of that substance off the birds and this may be important if the rocker chiller is functioning as a pre-chiller where the birds are first placed for treatment in the pre-chiller and then moved to the final chiller.

When the rocker chiller disclosed herein is functioning as a pre-chiller, the temperature of the water in the pre-chiller is usually significantly higher than the temperature of the water in the final chiller, and at the higher temperature the compression and turbulence action experienced in the pre-chiller tends to remove more of the unwanted substances from the surfaces of the carcasses while the surfaces of the carcasses are relatively warm. The warmer surfaces of the carcasses are more subject to being cleansed by the turbulence of the water and the impact against the carcasses. The oil and bits of fat and organic matter on the meat tend to be washed off the carcasses in the chiller when the temperature of the carcasses is still above about 60° F. The combination of the higher temperature and the more vigorous impact and churning of the carcasses provides a cleaner carcass at the exit of the pre-chiller. Thus, these items, skin oil, bits of fat, organic matter, etc. tend to remain in the heat exchanging liquid of the pre-chiller, where it is not transferred to the subsequent main chiller, where disinfectant in the main chiller can be used at a lower concentration for providing the same cleaning results. A stronger dose of disinfectant in the pre-chiller allows a minimal dose of disinfectant in the final chiller.

By scrubbing the birds in the pre-chiller, less organic matter is transferred into the final chiller and whatever chlorine or other disinfectant is used is more available to attack the microbes of the carcasses.

The cycles of alternate compression and relaxation of the water on opposite sides of the baffle assembly as shown in FIGS. 1A, 1B and 1C tends to "massage" the soft tissues of the poultry carcasses and encourage moisture retention. The baffle assembly configuration increases and decreases liquid pressure on opposite sides of the baffle as it sweeps in opposite directions across the tank in a cycle pattern. This change in pressure is relatively small, only a few inches of water head, as shown in FIGS. 3A and 3B, but when the pressure change is applied repeatedly along the length of the travel of the carcasses, it tends to have an effect of compression and expansion of the bird carcasses, resulting in more water retention and expelling of undesirable surface tissues on the birds.

Figure 4:
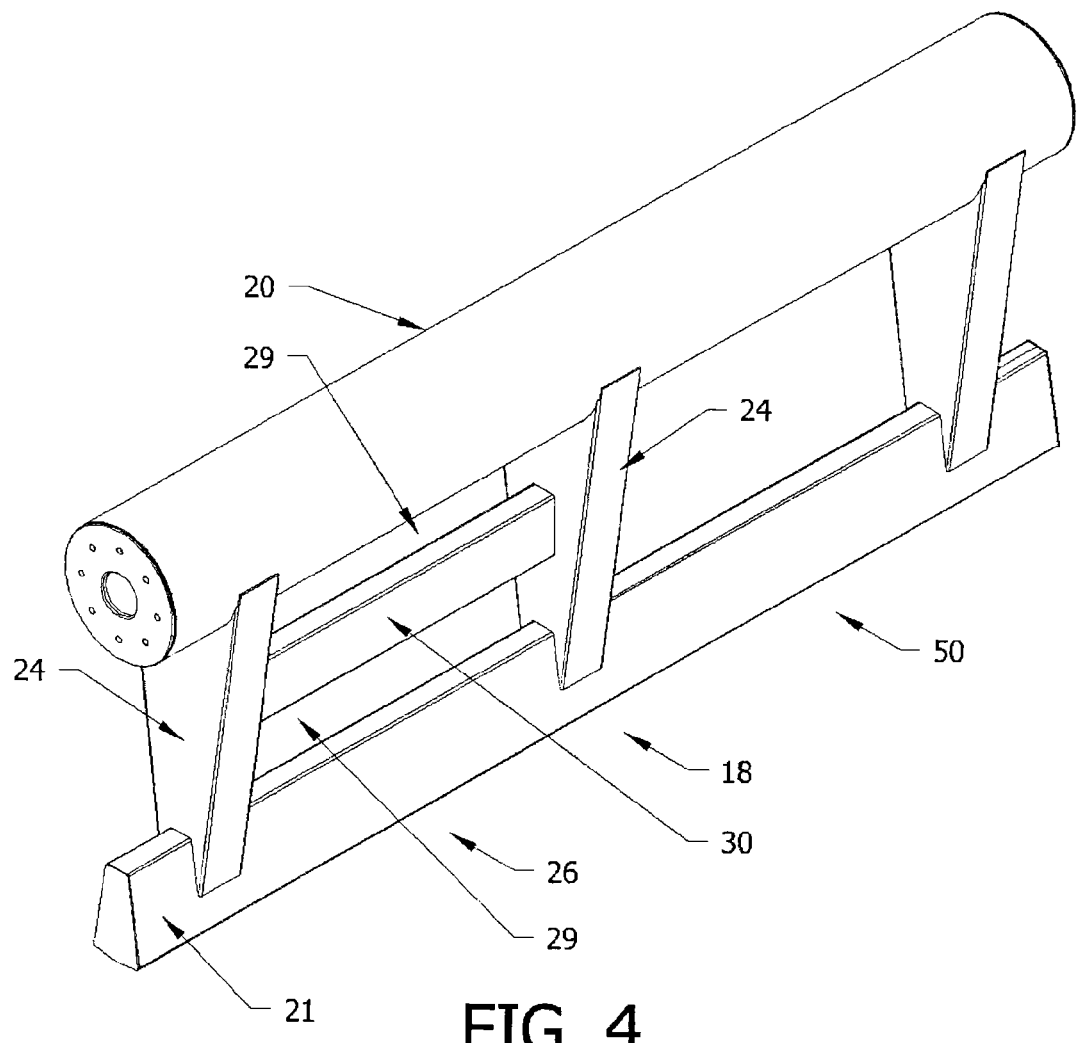
FIG. 4 is a perspective view of a baffle assembly, similar to FIG. 2F, but the baffle does not extend the full length of the tank.

FIG. 4 illustrates an embodiment of the baffle assembly in which the baffle 30 does not extend the full length of the baffle blade 21 and drive shaft 20, but leaves an open space between adjacent support arms 24. This allows the carcasses 28 to be free of the compression strokes of the baffle 26 when in the open space and to be more gently handled while continuing to be chilled by the heat exchanging liquid. For example the open space may be at least ten percent (10%) of the length of the tank.

Although preferred embodiments of the invention have been disclosed in detail herein, it will be obvious to those skilled in the art that variations and modifications of the disclosed embodiments can be made without departing from the spirit and scope of the invention as set forth in the following claims.

The invention claimed is:

1. A rocker chiller comprising:
   an elongated tank including a curved bottom portion configured to hold heat-exchanging liquid at a liquid level in said tank and for receiving carcasses in the heat-exchanging liquid in said tank,
   a baffle assembly extending along the length of said tank, said baffle assembly including a drive shaft above said curved bottom portion of said tank, and a baffle extending downwardly from said drive shaft toward said bottom portion of said tank and including a distal edge adjacent said bottom wall of said tank, said baffle and sized, shaped and positioned to sweep closely adjacent the facing curved bottom portion of said tank,
   power means connected to said baffle assembly for oscillating said baffle side to side in an arc along said curved bottom portion of said tank,
   said baffle defining openings therethrough, said openings in said baffle being sized and shaped to pass the heat-exchanging liquid through said openings from one side to the other side of said baffle in directions opposite to the directions of the oscillations of said baffle and for said baffle to retard the movement of at least some of the carcasses from one side to the other side of said baffle as said baffle oscillates;
   the configuration of said baffle selected from the group consisting of,
      at least one elongated baffle slat positioned between said drive shaft and said distal edge defining said openings between said baffle slat and said drive shaft and between said baffle slat and said distal edge,
      a plurality of elongated baffle slats positioned between said drive shaft and said distal edge and defining openings between said baffle slats,
      a plurality of elongated parallel spaced bars extending radially from said drive shaft and defining said openings between said spaced bars,
      a perforated sheet with the perforations of said sheet forming said openings, and
      a plurality of horizontally extending parallel spaced bars positioned between said drive shaft and said distal edge and defining said baffle openings between said spaced bars.

2. The rocker chiller of claim 1, wherein a baffle blade defines said distal edge of said baffle.

3. The rocker chiller of claim 1 and further including a carcass guide for directing carcasses entering the tank to one side or to the other side of said baffle in approximately equal numbers over time.

4. The rocker chiller of claim 1, wherein said tank includes a longitudinal axis and said curved bottom portion of said tank extends about said longitudinal axis, and said baffle assembly is configured to oscillate about the longitudinal axis, such that said baffle travels along an arc that substantially follows said curved bottom portion of said tank.

5. The rocker chiller of claim 3, wherein said carcass guide is constructed to move in unison with said baffle.

6. The rocker chiller of claim 3, wherein said carcass guide is constructed to move toward one side of the tank as the baffle moves toward the other side of the tank.

7. The rocker chiller of claim 1, wherein said power means connected to the baffle assembly is configured for intermittently pausing the baffle assembly for periods of rest at one or more predetermined positions within the range of motion of said baffle assembly.

8. The rocker chiller of claim 2, wherein said baffle blade extends farther along the length of said baffle assembly than said baffle, such that for part of the length of said baffle assembly the carcasses are retarded from moving from one side to the other side of said baffle assembly, and for the remainder of the length of the baffle blade the carcasses may move from one side to the other side of the baffle blade without restriction of said baffle.

9. The rocker chiller of claim 1 in which said baffle assembly substantially divides the heat exchanging liquid into at least two regions of heat exchanging liquid in said tank.

10. The rocker chiller of claim 9, wherein said regions of heat exchanging liquid vary in volume in response to said baffle assembly oscillations.

* * * * *

UNITED STATES PATENT AND TRADEMARK OFFICE
CERTIFICATE OF CORRECTION

| | | |
|---|---|---|
| PATENT NO. | : 8,146,380 B1 | Page 1 of 1 |
| APPLICATION NO. | : 13/158661 | |
| DATED | : April 3, 2012 | |
| INVENTOR(S) | : Terry A. Wright and John P. Shell | |

It is certified that error appears in the above-identified patent and that said Letters Patent is hereby corrected as shown below:

IN THE CLAIMS:
Column 7, line 66, claim 1, the word "and" is deleted.

Signed and Sealed this
Twenty-ninth Day of May, 2012

David J. Kappos
*Director of the United States Patent and Trademark Office*

US008146380C1

(12) EX PARTE REEXAMINATION CERTIFICATE (10813th)
United States Patent
Wright et al.

(10) Number: US 8,146,380 C1
(45) Certificate Issued: Feb. 10, 2016

(54) ROCKER CHILLER WITH IMPROVED PRODUCT MOISTURE RETENTION

(75) Inventors: Terry A. Wright, Cary, NC (US); John P. Shell, Raleigh, NC (US)

(73) Assignee: MORRIS & ASSOCIATES, INC., Garner, NC (US)

Reexamination Request:
No. 90/012,927, Jul. 25, 2013

Reexamination Certificate for:
Patent No.: 8,146,380
Issued: Apr. 3, 2012
Appl. No.: 13/158,661
Filed: Jun. 13, 2011

Certificate of Correction issued May 29, 2012

Related U.S. Application Data

(63) Continuation-in-part of application No. 13/070,521, filed on Mar. 24, 2011.

(60) Provisional application No. 61/424,363, filed on Dec. 17, 2010.

(51) Int. Cl.
*F25D 17/02* (2006.01)
*F25D 25/02* (2006.01)
*F28D 11/08* (2006.01)
*F28F 17/00* (2006.01)
*F28F 13/12* (2006.01)
*B01F 11/00* (2006.01)
*B01F 7/00* (2006.01)
*A21D 4/00* (2006.01)
*A23C 3/00* (2006.01)
*B01F 11/04* (2006.01)
*F28C 3/00* (2006.01)

(52) U.S. Cl.
CPC ............... *B01F 11/04* (2013.01); *F28C 3/005* (2013.01)

(58) Field of Classification Search
None
See application file for complete search history.

(56) References Cited

To view the complete listing of prior art documents cited during the proceeding for Reexamination Control Number 90/012,927, please refer to the USPTO's public Patent Application Information Retrieval (PAIR) system under the Display References tab.

*Primary Examiner* — Jeffrey L Gellner

(57) ABSTRACT

The rocker chiller 10 includes a semi-cylindrical tank 12 filled with heat exchanging liquid and a baffle assembly 18 that rocks back and forth across the bottom wall of the tank. The baffle 26 of the baffle assembly 18 defines baffle openings 29 that are sized and shaped to pass the heat exchanging liquid through the openings in response to the rocking of the baffle, but small enough so that the baffle engages and retards the movement of at least some of the carcasses from moving through the baffle, thereby massaging the carcasses and increasing the moisture retained in the carcasses.

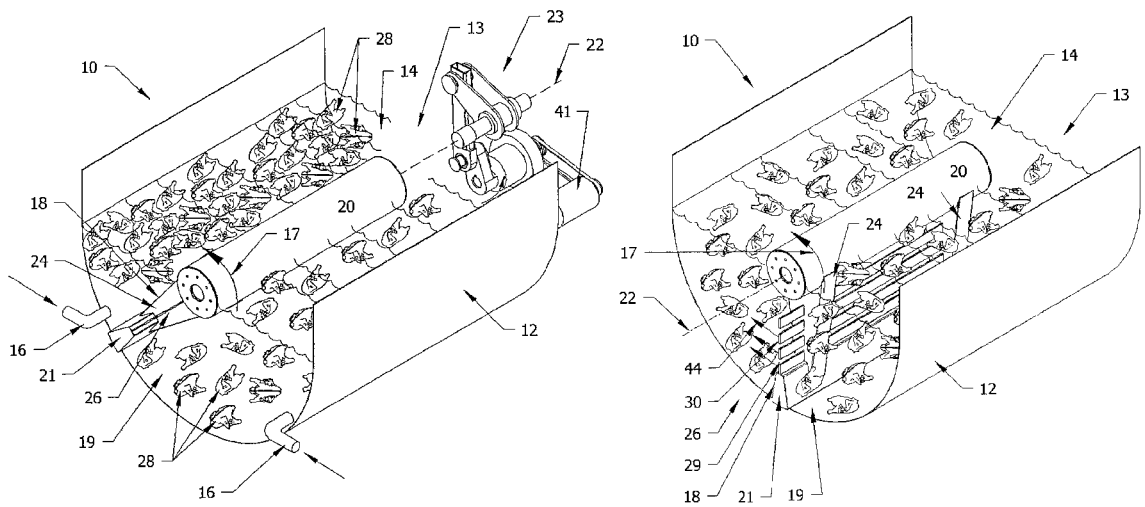

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9 and 10 are determined to be patentable as amended.

Claims 2-8, dependent on an amended claim, are determined to be patentable.

New claim 11 is added and determined to be patentable.

1. A rocker chiller comprising:
an elongated tank including a curved bottom portion configured to hold heat-exchanging liquid at a liquid level in said tank and for receiving carcasses in the heat-exchanging liquid in said tank,
a baffle assembly extending along the length of said tank, said baffle assembly including a drive shaft above said curved bottom portion of said tank, and a baffle extending downwardly from said drive shaft toward said bottom portion of said tank and including a distal edge adjacent said *curved* bottom [wall] *portion* of said tank, said baffle sized, shaped and positioned to sweep closely adjacent the facing curved bottom portion of said tank,
power means connected to said baffle assembly for oscillating said baffle side to side in an arc along said curved bottom portion of said tank,
said baffle defining openings therethrough, said openings in said baffle being sized and shaped to pass the heat-exchanging liquid through said openings from one side to the other side of said baffle in directions opposite to the directions of the oscillations of said baffle and for said baffle to retard the movement of at least some of the carcasses from one side to the other side of said baffle as said baffle oscillates;
the configuration of said baffle selected from the group consisting of,
at least one elongated baffle slat positioned between said drive shaft and said distal edge defining said openings between said baffle slat and said drive shaft and between said baffle slat and said distal edge,
a plurality of elongated baffle slats positioned between said drive shaft and said distal edge and defining openings between said baffle slats,
a plurality of elongated parallel spaced bars extending radially from said drive shaft and defining said openings between said spaced bars,
a perforated sheet with the perforations of said sheet forming said openings, and
a plurality of horizontally extending parallel spaced bars positioned between said drive shaft and said distal edge and defining said baffle openings between said spaced bars.

9. The rocker chiller of claim 1 in which said baffle assembly substantially divides [the heat exchanging liquid] *said tank* into at least two *lateral* regions [of heat exchanging liquid in said tank] *such that said heat exchanging liquid can freely communicate between said regions while said carcasses are inhibited from communicating between said regions.*

10. The rocker chiller of claim 9, wherein said *lateral* regions of [heat exchanging liquid] *said tank* vary in volume in response to said baffle assembly oscillations.

*11. A rocker chiller comprising:*
*an elongated tank including a curved bottom portion configured to hold heat-exchanging liquid at a liquid level in said tank and for receiving carcasses in the heat-exchanging liquid in said tank,*
*a baffle assembly extending along the length of said tank, said baffle assembly including a drive shaft above said curved bottom portion of said tank, and a baffle extending downwardly from said drive shaft toward said curved bottom portion of said tank and positioned at a level in said tank to substantially divide the carcasses to one side or the other side of the baffle, and including a distal edge adjacent said curved bottom portion of said tank,*
*said baffle sized, shaped and positioned to sweep closely adjacent the facing curved bottom portion of said tank and through the liquid in said tank at the level of the carcasses in said tank to urge the carcasses laterally in the liquid in the tank,*
*power means connected to said baffle assembly for oscillating said baffle side to side in an arc along said curved bottom portion of said tank,*
*said baffle defining openings therethrough, said openings in said baffle being sized and shaped to pass the heat-exchanging liquid through said openings from one side to the other side of said baffle in directions opposite to the directions of the oscillations of said baffle and for said baffle to retard the movement of at least some of the carcasses from one side to the other side of said baffle as said baffle oscillates,*
*such that said carcasses retarded from passing through said baffle are buffeted together more vigorously within the liquid and consequentially retain moisture;*
*the configuration of said baffle selected from the group consisting of,*
  *at least one elongated baffle slat positioned between said drive shaft and said distal edge defining said openings between said baffle slat and said drive shaft and between said baffle slat and said distal edge,*
  *a plurality of elongated baffle slats positioned between said drive shaft and said distal edge and defining openings between said baffle slats,*
  *a plurality of elongated parallel spaced bars extending radially from said drive shaft and defining said openings between said spaced bars,*
  *a perforated sheet with the perforations of said sheet forming said openings, and*
  *a plurality of horizontally extending parallel spaced bars positioned between said drive shaft and said distal edge and defining said baffle openings between said spaced bars.*

\* \* \* \* \*